US011743777B2

United States Patent
Tripathi

(10) Patent No.: US 11,743,777 B2
(45) Date of Patent: Aug. 29, 2023

(54) FLEXIBLE QUALITY OF SERVICE FRAMEWORK FOR DIVERSE NETWORKS

(71) Applicant: Samsung Electronics Co., Ltd., Suwon-si (KR)

(72) Inventor: Nishithkumar D. Tripathi, Parker, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 17/460,050

(22) Filed: Aug. 27, 2021

(65) Prior Publication Data
US 2022/0070738 A1 Mar. 3, 2022

Related U.S. Application Data

(60) Provisional application No. 63/141,752, filed on Jan. 26, 2021, provisional application No. 63/079,723, (Continued)

(51) Int. Cl.
*H04W 28/24* (2009.01)
*H04W 28/02* (2009.01)
*H04W 8/24* (2009.01)

(52) U.S. Cl.
CPC ............ *H04W 28/24* (2013.01); *H04W 8/24* (2013.01); *H04W 28/0268* (2013.01)

(58) Field of Classification Search
CPC ... H04W 8/24; H04W 28/0215; H04W 28/24; H04W 28/0268
See application file for complete search history.

(56) References Cited

U.S. PATENT DOCUMENTS

| 8,792,439 | B2 * | 7/2014 | Kahn | H04W 28/22 370/232 |
| 2008/0299911 | A1 * | 12/2008 | Chen | H04W 28/24 455/67.13 |
| 2014/0233380 | A1 | 8/2014 | Kim et al. | |
| 2017/0359749 | A1 * | 12/2017 | Dao | H04L 47/2416 |
| 2018/0351610 | A1 * | 12/2018 | Zhang | H04B 7/0456 |
| 2018/0376446 | A1 * | 12/2018 | Youn | H04W 8/20 |

(Continued)

FOREIGN PATENT DOCUMENTS

| CN | 110166407 A | * | 8/2019 |
| WO | 2013062363 A1 | | 5/2013 |
| WO | 2018084844 A1 | | 5/2018 |

OTHER PUBLICATIONS

International Search Report and Written Opinion of the International Searching Authority dated Nov. 29, 2021, in connection with International Application No. PCT/KR2021/011875, 9 pages.

(Continued)

*Primary Examiner* — Mehmood B. Khan

(57) ABSTRACT

Methods and apparatuses in a wireless communication system. A method of operating a user equipment (UE) includes generating an indicator indicating that the UE is capable of supporting adjusted quality of service (QoS), wherein the adjusted QoS corresponds to scaling of QoS parameters associated with an existing QoS indicator. The method also includes generating a capability message comprising the indicator. The method also includes transmitting, to a base station (BS), the capability message including the indicator. The method further includes receiving, from the BS, a message comprising an adjusted QoS value based on the scaling of QoS parameters associated with the existing QoS indicator.

20 Claims, 8 Drawing Sheets

Related U.S. Application Data filed on Sep. 17, 2020, provisional application No. 63/073,780, filed on Sep. 2, 2020.

(56) References Cited

U.S. PATENT DOCUMENTS

| | | | | |
|---|---|---|---|---|
| 2019/0150023 A1* | 5/2019 | Cho | ............... | H04W 28/0263 370/235 |
| 2019/0159059 A1* | 5/2019 | Jheng | ............... | H04W 28/0268 |
| 2019/0394279 A1* | 12/2019 | Dao | ............... | H04W 48/04 |
| 2020/0077356 A1* | 3/2020 | Youn | ............... | H04W 68/02 |
| 2020/0137675 A1* | 4/2020 | Park | ............... | H04W 68/005 |
| 2020/0296618 A1* | 9/2020 | You | ............... | H04W 28/0263 |
| 2022/0408335 A1* | 12/2022 | Xu | ............... | H04W 76/20 |

OTHER PUBLICATIONS

Mediatek Inc., "Reflective QoS support indication at PDU Session Modification," S2-180369, 3GPP TSG-SA2 Meeting #125, Gothenburg, Sweden, Jan. 21-26, 2018, 4 pages.

"3rd Generation Partnership Project; Technical Specification Group Radio Access Network; Study on New Radio (NR) to support non-terrestrial networks (Release 15)", 3GPP TR 38.811 V15.2.0, Sep. 2019, 126 pages.

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.

"5G; NR; Multiplexing and channel coding (3GPP TS 38.212 version 15.8.0 Release 15)", ETSI TS 138 212 V15.8.0, Jan. 2020, 106 pages.

"5G; NR; Physical channels and modulation (3GPP TS 38.211 version 15.8.0 Release 15)", ETSI TS 138 211 V15.8.0, Jan. 2020, 100 pages.

"5G; NR; Medium Access Control (MAC) protocol specification (3GPP TS 38.321 version 16.2.1 Release 16)", ETSI TS 138 321 V16.2.1, Nov. 2020, 156 pages.

"5G; NR; Radio Resource Control (RRC); Protocol specification (3GPP TS 38.331 version 16.2.0 Release 16)", ETSI TS 138 331 V16.2.0, Nov. 2020, 908 pages.

* cited by examiner

FLEXIBLE QUALITY OF SERVICE FRAMEWORK FOR DIVERSE NETWORKS

CROSS-REFERENCE TO RELATED APPLICATIONS AND CLAIM OF PRIORITY

The present application claims priority to U.S. Provisional Patent Application No. 63/073,780, filed on Sep. 2, 2020; U.S. Provisional Patent Application No. 63/079,723, filed on Sep. 17, 2020; and U.S. Provisional Patent Application No. 63/141,752, filed on Jan. 26, 2021. The content of the above-identified patent document is incorporated herein by reference.

TECHNICAL FIELD

The present disclosure relates generally to a diverse networks and, more specifically, the present disclosure relates to a flexible quality of service control for diverse networks including non-terrestrial networks and high capacity networks.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency, coverage, and quality of service are of paramount importance.

SUMMARY

The present disclosure generally relates to diverse networks and, more specifically, the present disclosure relates to a flexible quality of service control for diverse networks including non-terrestrial networks and high capacity networks.

In another embodiment, a UE in a wireless communication system is provided. The UE comprises a processor configured to generate an indicator indicating that the UE is capable of supporting adjusted quality of service (QoS), wherein the adjusted QoS corresponds to a scaling of QoS parameters associated with an existing QoS indicator; and generate a capability message comprising the indicator. The UE further comprises a transceiver operably connected to the processor, the transceiver configured transmit, to a base station (BS), transmit, to a base station (BS), the capability message including the indicator; and receive, from the BS, a message comprising an adjusted QoS value based on the scaling of the QoS parameters associated with the existing QoS indicator.

In one embodiment, a base station (BS) in a wireless communication system is provided. The BS comprises a transceiver configured to receive, from a user equipment (UE), a capability message comprising an indicator, the indicator configured to indicate that the UE is capable of supporting adjusted quality of service (QoS), wherein the adjusted QoS corresponds to scaling of QoS parameters associated with an existing QoS indicator. The BS further comprises a processor operably connected to the transceiver. The processor is configured to: identify the indicator; transmit a variable QoS capability to a network entity; receive an adjusted QoS value from the network entity, the adjusted QoS value based on the scaling of QoS parameters associated with the existing QoS indicator; and transmit the adjusted QoS value to the UE.

In yet another embodiment, a method of a user equipment (UE) a wireless communication system is provided. The method includes generating an indicator indicating that the UE is capable of supporting adjusted quality of service (QoS), wherein the adjusted QoS corresponds to scaling of QoS parameters associated with an existing QoS indicator. The method also includes generating a capability message comprising the indicator. The method also includes transmitting, to a base station (BS), the capability message including the indicator. The method further includes receiving, from the BS, a message comprising an adjusted QoS value based on the scaling of QoS parameters associated with the existing QoS indicator.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, a reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
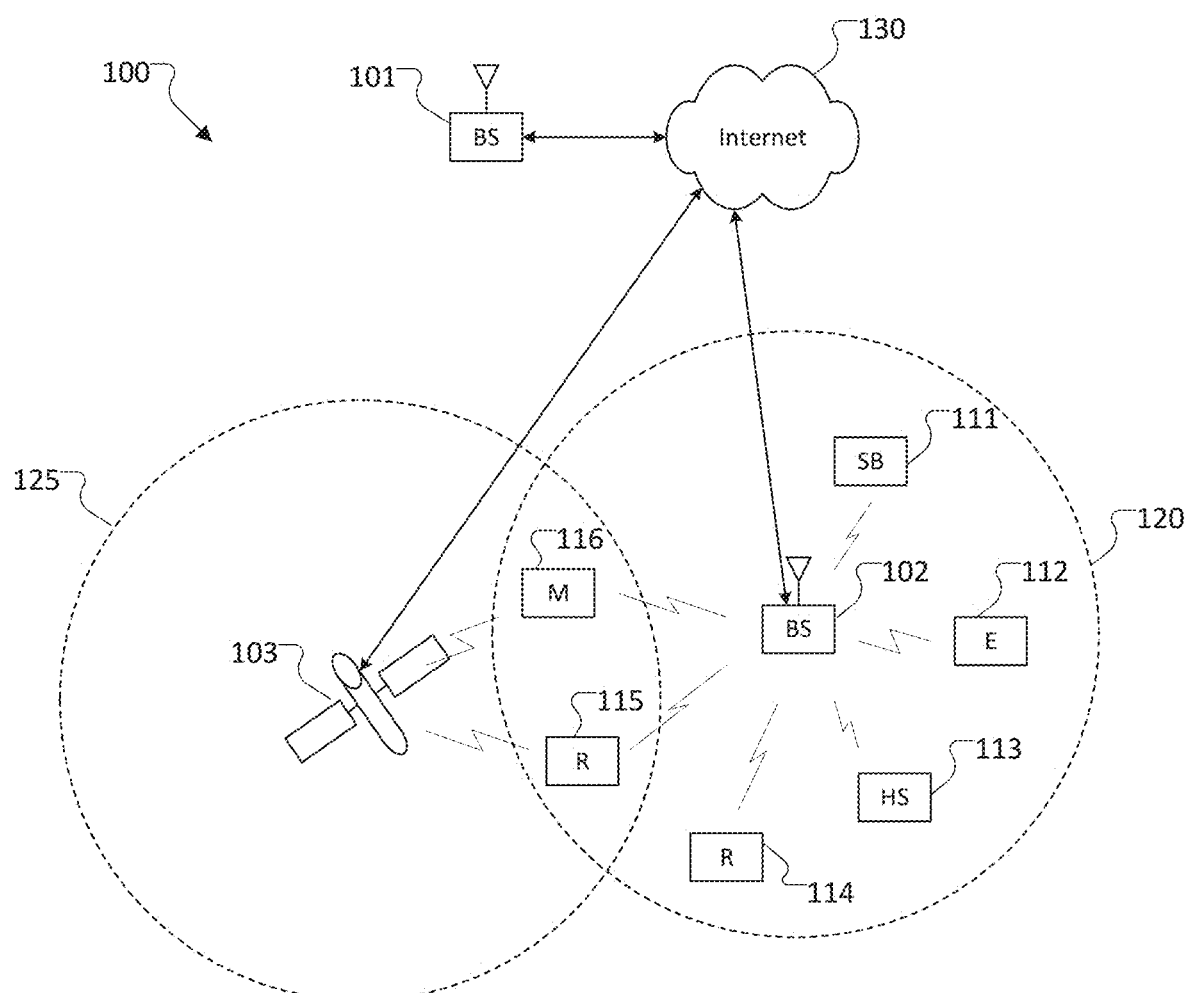
FIG. 1 illustrates an example wireless network according to embodiments of the present disclosure.
Figure 2:
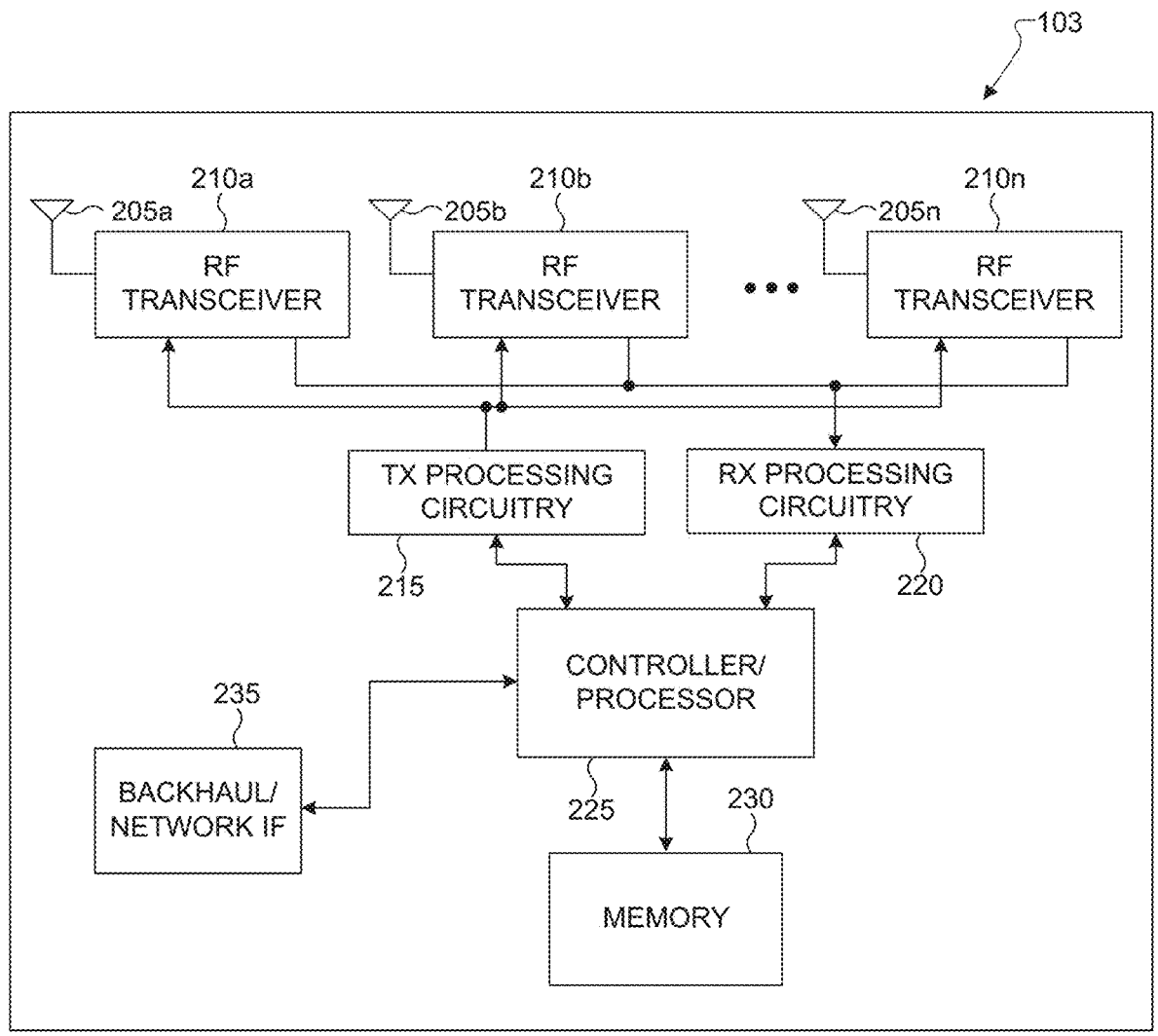
FIG. 2 illustrates an example gNB according to embodiments of the present disclosure.
Figure 3:
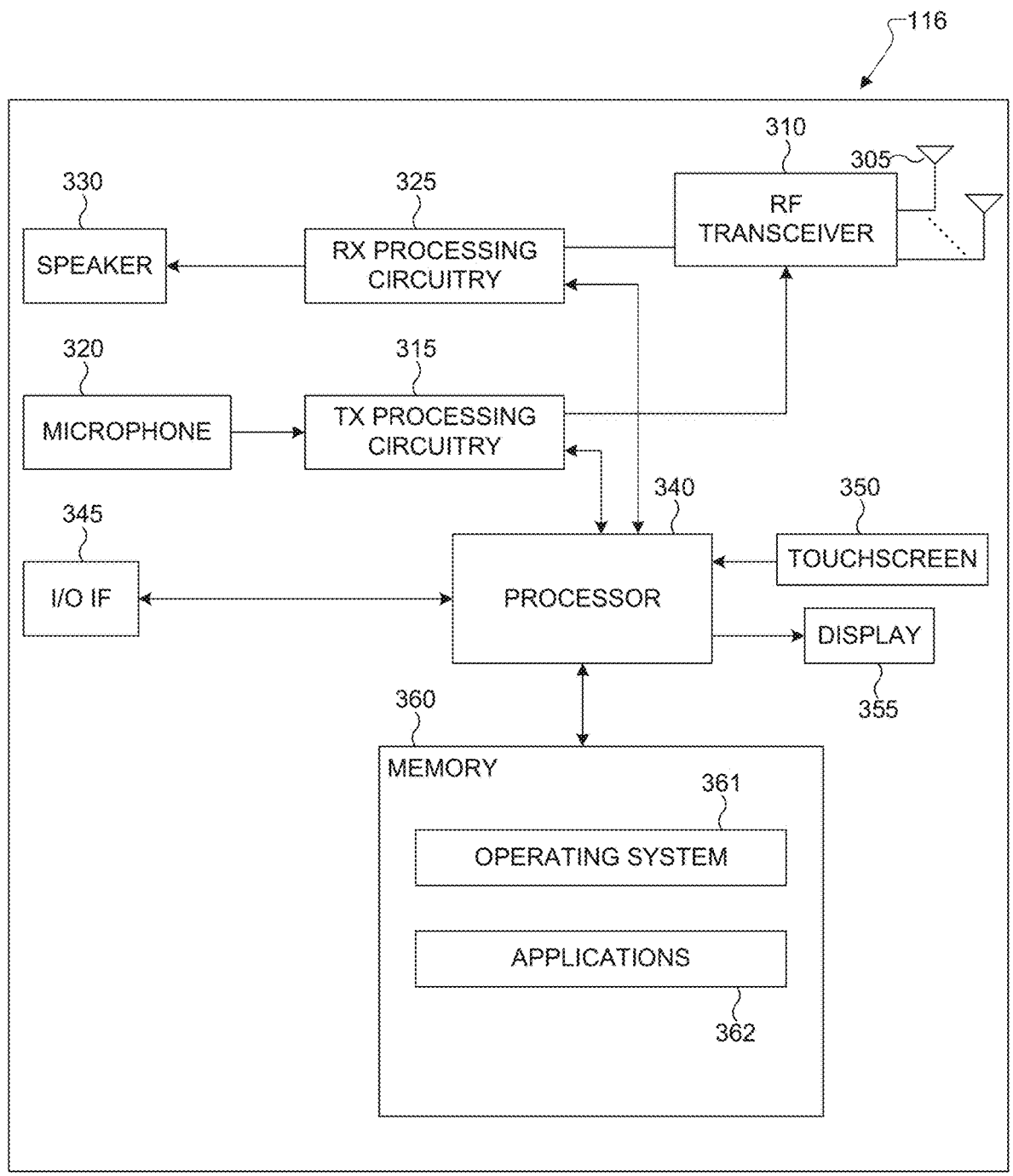
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network. In certain embodiments, the gNB 103 is a non-terrestrial BS. For example, gNB 103 can be a satellite positioned in a geosynchronous equatorial orbit (geostationary orbit, GEO) or in a low earth orbit (LEO).

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The coverage area 125 provided by gNB 103 can be part of a non-terrestrial network (NTN). The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only.

It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for flexible quality of service control for diverse networks. In certain embodiments, and one or more of the gNBs 101-103 includes circuitry, programing, or a combination thereof for flexible quality of service control for diverse networks.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 103 according to embodiments of the present disclosure. The embodiment of the gNB 103 illustrated in FIG. 2 is for illustration only, and the gNBs 101 and 102 of FIG. 1 could have the same or similar configuration. However, gNBs come in a wide variety of configurations, and FIG. 2 does not limit the scope of this disclosure to any particular implementation of a gNB.

As shown in FIG. 2, the gNB 103 includes multiple antennas 205a-205n, multiple RF transceivers 210a-210n, transmit (TX) processing circuitry 215, and receive (RX) processing circuitry 220. The gNB 103 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 103. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 103 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 103 to communicate with other devices or systems over a backhaul connection or over a network. The interface 235 could support communications over any suitable wireless connection(s). When disposed as part of a terrestrial network, such as gNB 101 and gNB 102, The interface 235 could support communications over any suitable wired or wireless connection(s). For example, when the gNB 103 is implemented as part of a cellular communication system (such as one supporting 5G/NR, LTE, or LTE-A), the interface 235 could allow the gNB 103 to communicate with other gNBs over a wireless backhaul connection while gNB 101 and gNB 102 can communicate with other gNBs over a wired or wireless backhaul connection. When the one or the gNBs 101-103 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of gNB 103, various changes may be made to FIG. 2. For example, the gNB 103, and respectively gNB 101 and 102 as part of terrestrial networks, could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Traditional eNBs and gNBs support several hundred or a couple of thousands of active RRC connections. To efficiently support a massive number of low-rate and delay-tolerant services along with traditional smartphones, a paradigm shift is needed; each relevant cell needs to have massive processing capability. With the wireless networks being virtualized, cloud-based computing and storage resources would facilitate implementation of eNBs/gNBs capable of supporting hundreds of thousands of active connections.

In the present disclosure, one or multiple approaches described below can be implemented to realize the concept of flexible quality of service (QoS) for diverse networks including a non-terrestrial network (NTN) and a high-capacity network. A geosynchronous equatorial orbit (GEO) satellite and high-altitude platform station (HAPS) with a fixed cell on earth are good candidates to support a massive number of delay-tolerant devices and Apps.

For the non terrestrial network (NTN) architecture, several embodiments are available. In one embodiment, a transparent GEO satellite payload can be used, where all the radio protocol stack processing is done at the ground-based eNB or gNB. Such eNB or gNB can make use of high-performance monolithic resources or cloud-based processing and memory resources (e.g., compute resources and storage resources of a cloud network).

In certain embodiments, for the NTN architecture, gNB 103 comprises a gNB-distributed unit (gNB-DU) disposed on the satellite and a gNB-centralized unit (gNB-CU) disposed on the ground. In such case, the gNB-CU can control the amount of data being sent to the gNB-DU based on gNB-DU memory capabilities. In an implementation-specific manner, the gNB-CU can take care most of the storage (e.g., at the packet data convergence protocol (PDCP) layer) to alleviate any significant memory requirements on the gNB-DU.

In certain embodiments, for the NTN architecture, new quantities such as ephemeris data and satellite elevation angle and new capabilities such as support for a terrestrial network (TN) and an NTN, TN-NTN service continuity, pre-compensation for timing and frequency synchronization, and types of devices (e.g., smartphones vs. a very small aperture terminal (VSAT)) are introduced. The embodiments of the present disclosure introduce signaling mechanisms to make use of these quantities and capabilities to support SON and MDT. The embodiments of the present disclosure introduce the signaling support for Self-Organizing Network (SON) and Minimization of Drive Tests (MDT) for an NTN. In particular, embodiments of the present disclosure enable the network and the UE to make use of SON/MDT features by supporting NTN-specific capabilities and NTN-specific measurements. The embodiments of the present disclosure provide an ability to facilitate cell selection/reselection and various SON algorithms such as Automatic Neighbor Relation (ANR) optimization, Physical Cell ID (PCI) configuration, RACH optimization, Capacity and Coverage Optimization (CCO), and Mobility Load Balancing (MLB)/Mobility Robustness Optimization (MRO).

Figure 4:
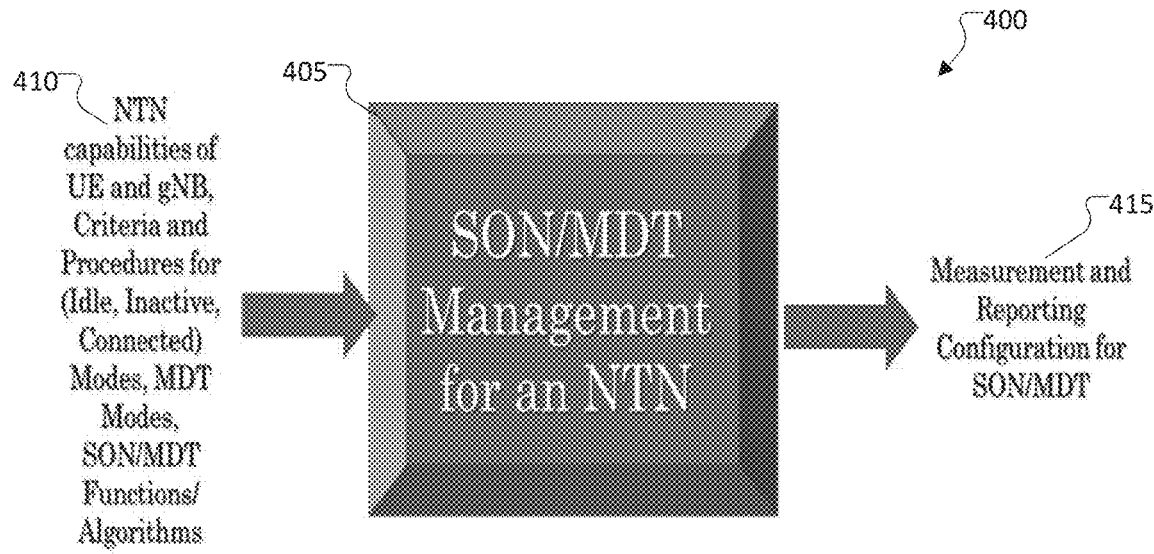
FIG. 4 illustrates an example overall management of measurements and reporting in support of self-organizing network and minimization of drive tests for a non-terrestrial network according to embodiments of the present disclosure.

FIG. 4 illustrates an example overall management of measurements and reporting in support of SON and MDT for an NTN according to embodiments of the present disclosure. An embodiment of the overall mechanism 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions.

In the example shown in FIG. 4, a SON/MDT management processor 405 receives NTN capabilities of UE 116 and gNB 103 criteria and procedures 410. The procedures define steps and processes for idle modes, inactive modes, and connected modes as well as MDT modes and SON/MDT functions and algorithms. The SON/MDT management processor 405 outputs Measurement and Reporting Configurations for SON/MDT 415.

Figure 5:
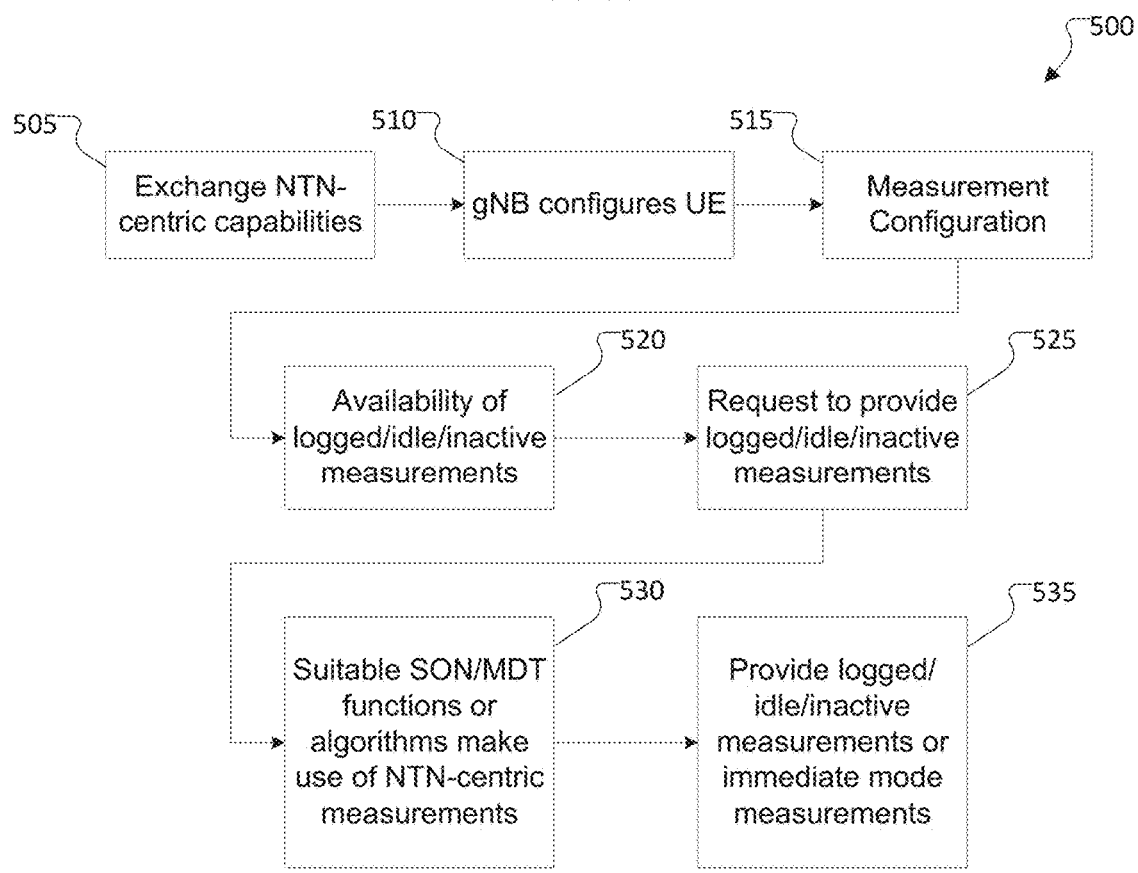
FIG. 5 illustrates an example management of measurements and reporting in support of self-organizing network and minimization of drive tests for a non-terrestrial network according to embodiments of the present disclosure.

FIG. 5 illustrates an example management of measurements and reporting in support of SON and MDT for an NTN according to embodiments of the present disclosure. An embodiment of the overall steps 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions.

In operation 505, UE 116 and the network exchange NTN-centric capabilities. In operation 510, gNB 103 configures UE 116 with a logged mode and immediate mode measurements and reporting to support SON/MDT for an NTN. In operation 515, UE 116 performs the measurements per the configuration established in operation 510. Based on the measurement conducted in operation 515, UE 116 informs the network about the availability of logged, idle, and inactive measurements in operation 520. In response, the network requests that UE 116 provide the logged, idle, and inactive measurements in operation 525. In operation 530, UE 116 provides logged, idle, and inactive mode measurements or an immediate mode measurement to gNB 103. In operation 535, a suitable SON/MDT function or algorithm uses the NTN-centric measurements obtained by UE 116 and gNB 103.

Figure 6:
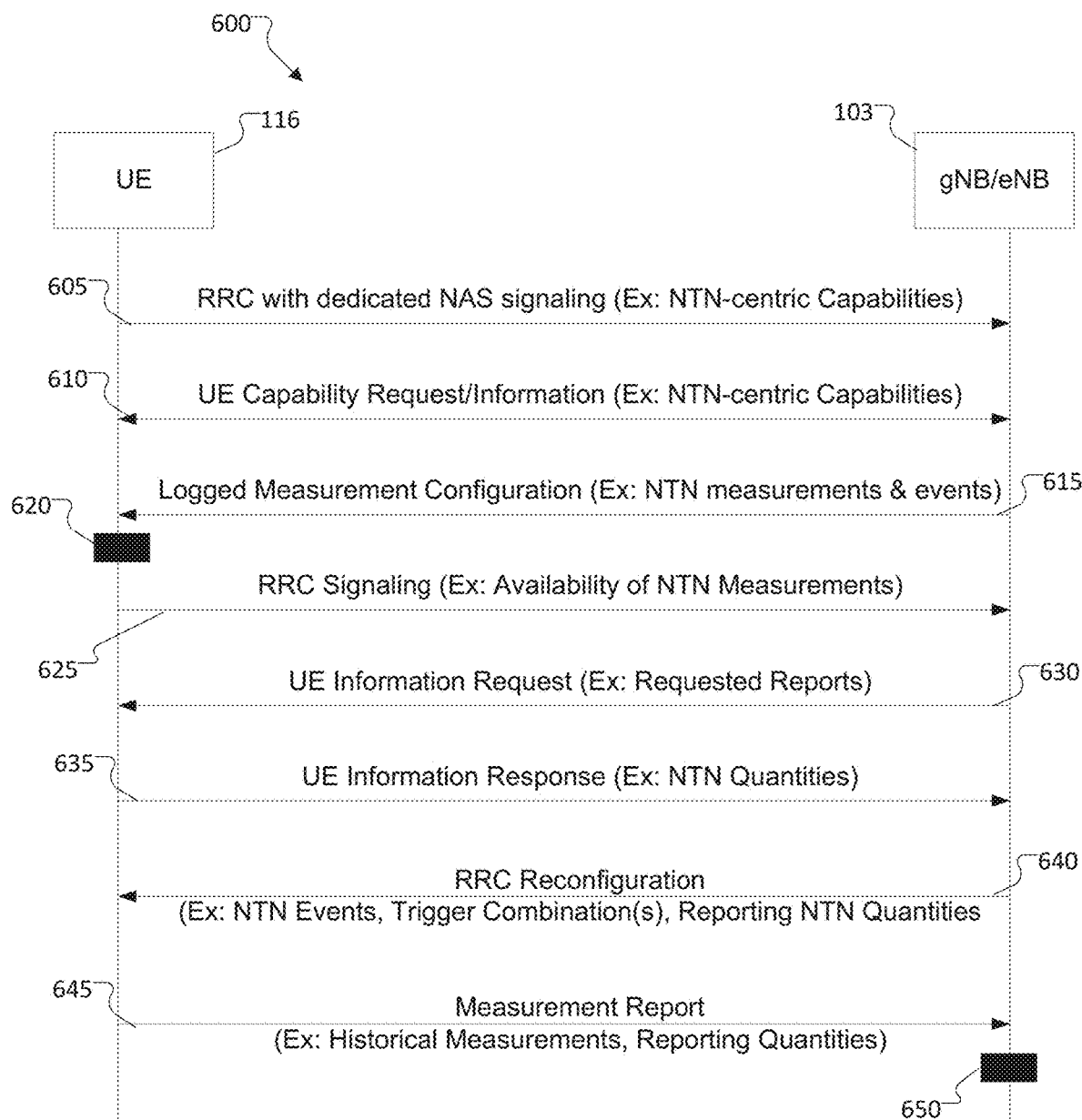
FIG. 6 illustrates a signaling flow for management of measurements and reporting in support of self-organizing network and minimization of drive for a non-terrestrial network according to embodiments of the present disclosure.

FIG. 6 illustrates a signaling flow for management of measurements and reporting in support of SON and MDT for an NTN according to embodiments of the present disclosure. An embodiment of the signaling flow for UE-radio network interactions 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, in certain embodiments, UE 116 sends a dedicated RRC signaling message 605 that contains a dedicate Non-Access Stratum (NAS) message. For example, the RRC signaling message 605 may be RRC Setup Complete and the embedded NAS message may be Registration Request. UE 116 can indicate its NTN-centric capabilities in the RRC signaling message 605. UE 116 can provide an early indication of one or more NTN-centric capabilities in the RRC signaling message 605 or UE 116 can indicate some or all of those NTN relevant capabilities in a capability request signal 610.

Several approaches are possible for UE 116 to indicate its capabilities relevant to NTN operations. In certain embodiments, UE 116 can indicate its support for NTN only or both NTN and TN. In certain embodiments, UE 116 can indicate its global navigation satellite system (GNSS) capabilities. In certain embodiments, UE 116 can indicate its support for an NTN type for data transfer, such as for LEO, GEO, and HAPS. For example, UE 116 can support GEO only to receive GNSS data; but may not support GEO for actual data transfer, such as to transmit less power in the uplink and save battery power. UE 116 can indicate its time and frequency compensation capabilities in certain embodiments. Specific to the measurements in support of SON/MDT, in one or more embodiments, UE 116 indicates its support for reporting of measurements such as: (A) ephemeris data (e.g., position (x, y, z) and velocity (vx, vy, vz)); (B) Reference Point coordinates (e.g., cell center) provided by the network and/or estimated by UE 116; (C) measured elevation angles for one or more cells (e.g., serving cell and/or neighbor cells); (D) time since last cell reselection; (E) time since last handover; (F) Timing Advance (absolute, relative to the gNB-provided value or relative to a specific Reference Point such as cell center); and (G) new NTN events.

In certain embodiments, the support for one or more (including all) of these measurements is mandatory for UE 116. In certain embodiments, UE 116 also reports multiple instances of such measurements along with instants associated with the measurements. For example, UE 116 may report a set of historical measurements including the ephemeris data at time t1 (e.g., provided by the network) and the ephemeris data at time t2 (estimated by the UE) in case of the ephemeris data example.

In certain embodiments, for a new NTN Event for the idle/inactive mode or logged measurement mode, UE 116 can support a new event "CellSelection/Reselection" event, where the cell selection/reselection related parameters and associated measurements (e.g., RSRP, elevation angle, and/or Timing Advance for the serving cell and suitable neighbor cells) are stored and reported by UE 116. In certain embodiments, for a new NTN Event for the idle/inactive mode or logged measurement mode, UE 116 can support a new event "StateTransition" event, where the measurements (e.g., RSRP, elevation angle, and/or Timing Advance for the serving cell and suitable neighbor cells) are stored and reported by the UE when UE 116 exits one mode (e.g., idle or inactive) and enters another mode (e.g., the connected mode). Such event, as a result of additional measurements made at a past instant, can help identify if the transition took a long time due to NTN delays, leading to a failure.

In certain embodiments, for an NTN Event for the connected mode, UE 116 can support a new measurement reporting event in support of handover with a specific combination of triggers. For example, UE 116 can indicate its support for (i) the combination of "RSRP" and "elevation angle" and (ii) the combination of "RSRP" and "time since last handover." In certain embodiments, UE 116 may be required to support some or all of the triggers for an NTN handover.

In capability request signal 610, gNB 103 sends UE Capability Enquiry message to inquire about the UE's NTN related capabilities mentioned in the RRC signaling message 605. The gNB 103 may ask UE 116 about selected NTN capabilities based on its own capabilities and preference in the capability request signal 610. The UE 116 replies with UE Capability Information and specifies its NTN related capabilities mentioned in the RRC signaling message 605.

The gNB 103 sends LoggedMeasurementConfiguration message 615 to configure the UE for measurements. This LoggedMeasurementConfiguration message 615 can be sent by gNB 103 to support UE-specific reporting (e.g., reporting associated with the signaling trace method) or non-UE-specific reporting (e.g., reporting associated with the management based trace method). In certain embodiments, gNB 103 can specify new NTN event(s) such as Cell Selection/Reselection. Furthermore, gNB 103 may specify "areaConfiguration" that specifies the geographic area in which the UE should make MDT measurements. Traditionally-supported areas include PLMN, NR CGIs, TACs, and TAIs. In certain embodiments, gNB 103 can specify to UE 116 new NTN measurements mentioned in the RRC signaling message 605. In certain embodiments, such measurements may be mandatory for UE 116 to measure and report.

In certain embodiments, gNB 103 does not include cellGlobalList in areaConfiguration when the NTN cells are moving on Earth. For Foxed-Earth cells or beams, cellGlobalList can be relevant or useful. It is noted that for non-Fixed-Earth beams, cellGlobalList is irrelevant.

In certain embodiments, gNB 103 includes in areaConfiguration one or more Virtual Tracking Area (VTA) Identities instead of typically-broadcast TACs/TAIs.

In operation 620, UE 116 starts making suitable measurements based on the explicit configuration from the LoggedMeasurementConfiguration message 615 and/or implicit/mandatory configuration. In certain embodiments, for every TAC/TAI included in areaConfiguration, when multiple TAIs/TACs are broadcast by an NTN cell, UE 116 makes measurements and performs area-specific logging when a TAI/TAC matches with any of the TAIs/TACs being broadcast by a cell. Even when the TACs/TAIs being broadcast by an NTN cell change, UE 116 continues to make measurements and performs area-specific logging as long as a TAI/TAC specified in areaConfiguration matches with any of the TAIs/TACs being broadcast by a cell.

In certain embodiments, UE 116 ignores any received cellGlobalList when the NTN cells are moving and does not perform area-based measurements and logging. Additionally, in an example approach, UE 116 records the reception of cellGlobalList as an error condition in such case.

In RRC signaling 625, UE 116 indicates the availability of measurements in an RRC message such as RRCSetupComplete and RRCResumeComplete. An existing IE logMeasAvailable can be enhanced or a new IE logMeasAvailableNTN can be defined.

In a UE information request 630, gNB 103 sends UE Information Request message to request UE 116 to provide one or more reports (e.g., idle mode measurements, logMeasReport, ConnEstFail Report, RA report, RLF report, and mobilityHistoryReport). These traditional reports for a Terrestrial Network are enhanced to include NTN-specific measurements and events mentioned in the RRC signaling message 605.

In certain embodiments, mobilityHistoryReport is modified when non-Fixed-Earth beams re used for an NTN. In certain embodiments, a list of VTAs or TACs/TAIs is used instead of NR CGIs, because NR CGIs keep changing for a given non-moving UE and these CGIs do not provide any information about the movement of UE 116.

In a UE information response 635, the UE 116 sends UE Information Response message to gNB 103 containing or more repots requested by gNB 103 in the UE information request 630. In certain embodiments, as part of MeasQuantityResults, in addition to typical include RSRP, RSRQ, and SINR, new NTN-specific measurements are included. As an example, UE 116 reports one or more of the following pieces of information for serving/failed cell and neighbor cells: such as ephemeris data (e.g., position (x, y, z) and velocity (vx, vy, vz)), Reference Point coordinates, measured elevation angles, time since last cell reselection, Timing Advance (absolute, relative to the gNB-provided value or relative to a specific Reference Point such as cell center), distance to serving and neighbor cells, and new NTN event specific parameters and measurements. In certain embodiments, UE 116 can explicitly indicate the NTN Type (e.g., TN vs. NTN, GEO vs. non-GEOs, Earth-fixed vs. Earth-moving beams) in the UE information response 635.

In certain embodiments, in UE information response 635, UE 116 reports the relevant system configuration such as periodicity of NTN-relevant SIBs and cell selection and reselection parameters to facilitate optimization of cell selection/reselection. In certain embodiments, in the UE information response 635, to enhance the random access procedure, UE 116 reports in the RA (Random Access) Report the transmit power level for the last RA preamble per attempt. In another approach, UE 116 also reports the open loop power control parameters obtained from System Information such as target received power at gNB 103, power step, and the maximum transmit power limit specified by gNB 103. In certain embodiments, UE 116 also reports its power class to gNB 103.

In support of immediate mode of MDT, an RRC configuration 640 and a Measurement report 645 are carried out.

In the RRC configuration 640, gNB 103 configures UE 116 with specific measurements and reporting events and may select periodical reporting or event-based reporting. In certain embodiments, gNB 103 specifies new NTN events with certain combination(s) of triggers such as (i) the combination of "RSRP" and "elevation angle" and (ii) the combination of "RSRP" and "time since last handover." In an example approach, gNB 103 asks UE 116 to report the following new NTN measurements for the serving and/or neighbor cells (in addition to typical TN measurements): ephemeris data estimated by UE 116 and associated instant(s), Reference Point coordinates estimated by UE 116 and associated instant(s), elevation angles and associated instants, timing advance (absolute and relative), and distance to serving and neighbor cells. The times, where appropriate, can be specified as a common time when multiple measurements are associated with the same instant; only different times are separately specified in an example embodiment.

In certain embodiments, gNB 103 asks UE 116 to report "the time since last handover" from the UE's perspective.

In the measurement report 645, UE 116 conveys the measurements in Measurement Report message based on the configuration specified by the gNB in the RRC configuration 640.

In operation 650, gNB 103 provides the reports from UE 116 as well as its own measurements to SON/MDT functions. In certain embodiments, in operation 650, gNB 103 reports to SON/MDT functions these static or semi-static measurements: the NTN GW coordinates, platform (i.e., satellites or HAPS) processing delay, NTN GW processing delay, gNB 103 processing delay, and NTN GW-gNB transport delay.

In certain embodiments, gNB 103 can explicitly indicate the NTN Type (e.g., TN vs. NTN, GEO vs. non-GEOs, Earth-fixed vs. Earth-moving beams) in operation 650.

The most-relaxed 5G QoS indicators (5QI's) from the delay perspective are 5QI=76 (one-way packet delay budget of 500 ms between UE 116 and the user plane function (UPF) and packet error rate of 10-4) and 5QI=8 or 9 (one-way packet delay budget of 300 ms between the UE and the UPF and packet error rate of 10-6). These QoS requirements cannot be met for GEOs. Furthermore, certain 5QIs can be met by some NTN Types (e.g., LEOs). However, long propagation delays put more constraints on gNB 103. For example, out of 300 ms delay between the UE and the P-GW, the 20 ms delay is between the UPF and gNB 103 and gNB 103 gets about 280 ms to send a packet to UE 116 with the target PER. However, longer satellite-to-ground delays make less time available to gNB 103. Hence, relaxation of the QoS criteria should be considered for an NTN.

Certain embodiments provide a system and method that enhances the QoS framework for an NTN. Embodiments of the present disclosure enable the service provider to meet the QoS requirements conveyed to subscribers. The service provider can properly provision suitable resources in the network to meet the target QoS requirements for an NTN. Additionally, a high-performance terrestrial network (TN) of future may be able to support enhanced QoS compared to the existing TNs. Hence, a flexible and easy-to-use mechanism is attractive for an NTN and a high-performance TN.

Figure 7:
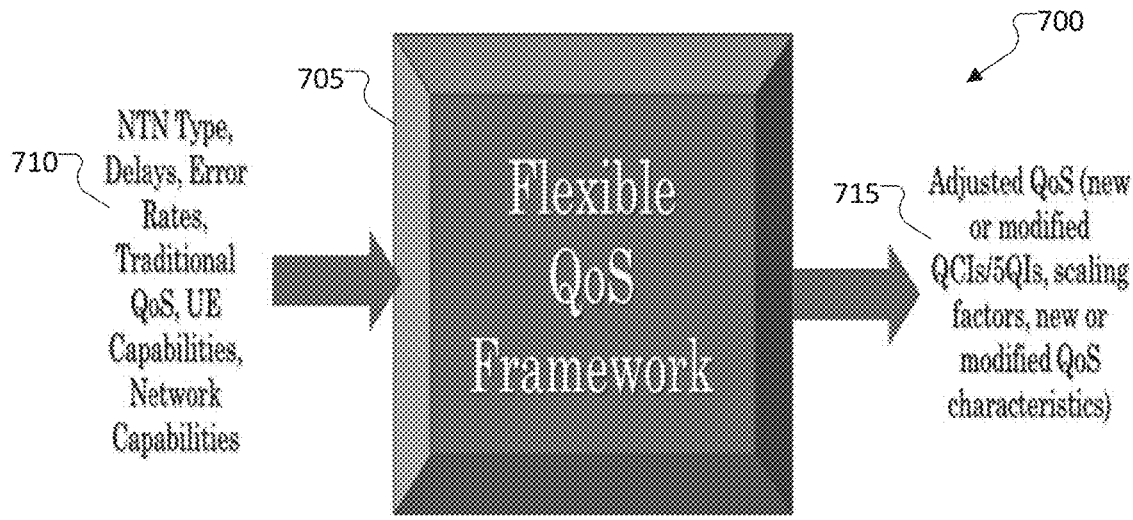
FIG. 7 illustrates an example overall mechanism for a flexible quality of service framework according to embodiments of the present disclosure.

FIG. 7 illustrates an example overall mechanism for a flexible QoS framework according to embodiments of the present disclosure. An embodiment of the overall mechanism 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

In the example shown in FIG. 7, a flexible QoS framework processor 705 receives NTN Type, error rates, traditional QoS, capabilities of UE 116 and network capabilities 710. The QoS framework processor 705 outputs adjusted QoS (new or modified), quality control indicators (QCIs), 5G QoS indicators (5QI's), scaling factors, and new or modified QoS characteristics 715.

Figure 8:
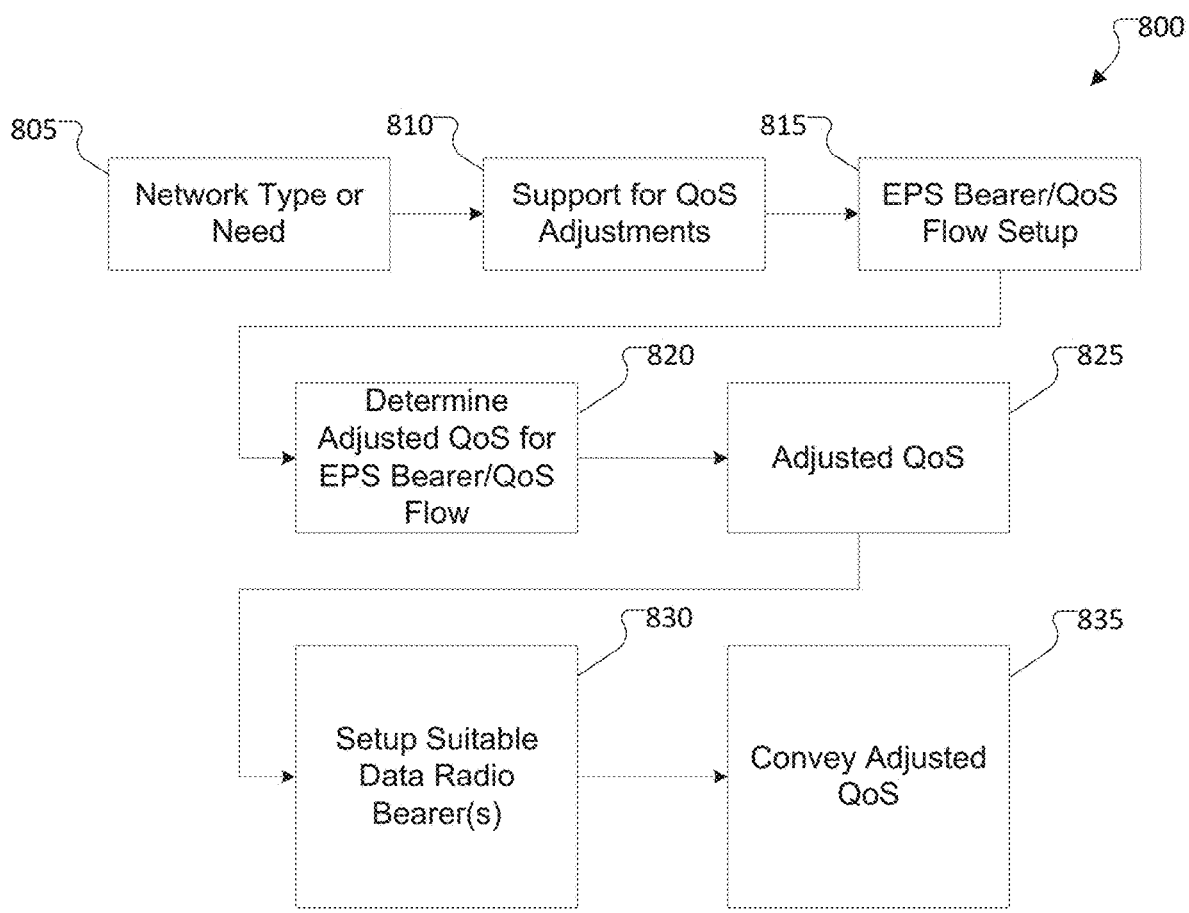
FIG. 8 illustrates an example process for flexible quality of service according to embodiments of the present disclosure.

FIG. 8 illustrates an example process for flexible QoS according to embodiments of the present disclosure. An embodiment of the overall steps 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

In operation 805, UE 116 and/or gNB 103 convey the network type and/or need for any QoS adjustment for one or more cells to the core network. In operation 810, UE 116 indicates the support for QoS adjustment to the core network explicitly and/or via gNB 102 or gNB 103 implicitly. In operation 815, the EPS Bearer/QoS Flow set up is initiated by UE 116 or the network. In operation 820, the core network determines the adjusted QoS for the EPS Bearer/QoS flow. In operation 825, the core network conveys the adjusted QoS to gNB 102 or gNB 103. In operation 830, gNB 103 sets up a suitable Data Radio Bearer(s) to reflect the adjusted QoS. In operation 835, the adjusted QoS is conveyed between the source and the destination during intra-RAT, inter-RAT, and inter-network, such as between TN and NTN, mobility.

Figure 9:
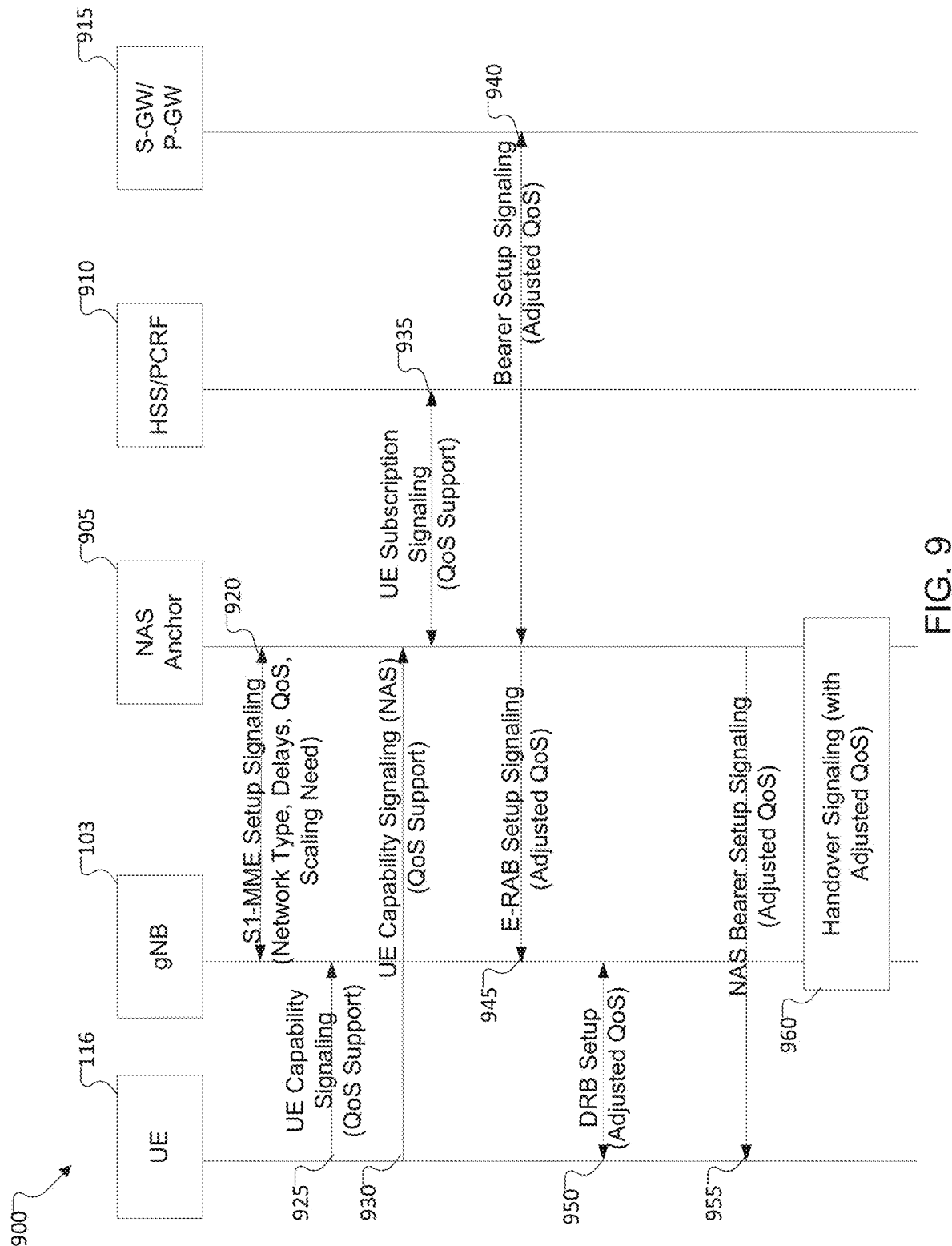
FIG. 9 illustrates an example signaling for UE-Network Procedures for a Flexible QoS Framework according to embodiments of the present disclosure.

FIG. 9 illustrates an example signaling for UE-Network Procedures for a Flexible QoS Framework according to embodiments of the present disclosure. An embodiment of the signaling flow for UE-radio network interactions 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. In the example shown in FIG. 9, operations by and signaling between UE 116, gNB 103, NAS signaling Anchor 905, Home Subscriber Server (HSS)/Policy and Charging Rules Function (PCRF) 910 and S-gateway (S-GW) and P-GW 915.

In the example shown in FIG. 9, the HSS/PCRF 910 keeps a record of the user's QoS subscriptions for the adjusted QoS, where the adjusted QoS is more stringent or less stringent than typical QoS parameters. For example, the HSS/PCRF 910 can include provisioning of longer or shorter delays compared to the target standardized delays based on the user's subscriptions and network capabilities. In an example approach, the network capabilities depend on the network type. In one example, the Network Type may distinguish among a regular Terrestrial Network (i.e., the network with typical QoS), a high-performance Terrestrial Network (i.e., the network with typical QoS) and a Non-Terrestrial Network. The user experiences the adjusted QoS based on its own capabilities and the network type that it accesses.

In the example shown in FIG. 9, gNB 103 and the NAS Anchor 905 exchanged an S1-MME setup signaling 920. In the S1-MME setup signaling 920, gNB 103 and the NAS Anchor 905 (i.e., the MME in the evolved Packet Core (EPC)) exchange S1-MME setup messages of S1 SETUP REQUEST and S1 SETUP RESPONSE. In certain embodiments, gNB 103 conveys to the MME the Network Type for each of its cells in S1 SETUP REQUEST message. In certain embodiments, gNB 103 explicitly mentions minimum and/or maximum round trip delays between UE 116 and gNB 103 to a mobility management entity (MME). In certain embodiments, gNB 103 mentions the support for QoS scaling for one or more QoS parameters. QoS scaling can provide a more stringent QoS or a more relaxed QoS in gNB's 103 network compared to standardized QoS. Examples of these QoS parameters include QCI (QoS Class Identifier), packet delay budget (i.e., the delay between the UE and the P-GW), and packet loss error rate. In certain embodiments, in support of the S1-MME setup signaling 920, gNB 103 can manage some cells that belong to one Network Type (e.g., a TN) and some cells that belong to another Network Type (e.g., an NTN). For example, in case of an extended reality (XR) application, QoS scaling can be applied to the XR frames such as one QoS scaling for one type of XR frames and another QoS scaling for another type of XR frames. Note that the same 5QI value can be used for different types of frames but different QoS scaling factors can be applied for different types of XR frames.

UE 116 and gNB 103 exchange capability messages 925. That is, UE 116 and gNB 103 exchange UE Capability Enquiry and UE Capability Information messages. In certain embodiments, gNB 103 can explicitly request UE 116 to specify its support for adjusted QoS. In certain embodiments, UE 116 specifies its support for the adjusted QoS in response to the request from gNB 106, or autonomously.

In certain embodiments, in the capability messages 925, the support for the adjusted QoS is implicit and does not require any explicit mention of QoS in the UE Capability Enquiry and UE Capability Information messages.

UE 116 transmits a capability signaling 930 through gNB 103 to the NAS Anchor 905. In the capability signaling 930, UE 116 explicitly conveys its support for the adjusted QoS to the MME in a NAS message such as Attach Request, TAU Request, and Service Request. In certain embodiments, UE 116 specifies the Network Type and the MME infers the UE's support for the adjusted QoS. In certain embodiments, the MME infers support by UE 116 for the adjusted QoS using the Network Type determined based on (i) gNB configuration received in the S1-MME setup signaling 920 and (ii) the ECGI present in an S1AP message (e.g., Initial UE Message) containing the UE's NAS message (and potentially timestamp).

In the capability signaling 930, when gNB 103 receives an RRC message from UE 116 containing a NAS message, gNB 103 selects an MME by considering the Network Type of the cell in which gNB 103 has received the message from UE 116. Some MMEs may be optimized for one Network Type and some MMEs may be optimized for another Network Type.

In UE Subscription signaling 935 between the NAS Anchor 905 and HSS/PCRF 910, the MME conveys the Network Type to the HSS 910 in an Update Location Request message. The MME, in an example approach, may also convey QoS adjustment indication. The HSS replies with the Update Location Answer message and specifies the QoS Adjustment support as part of Subscription-Data. In certain embodiments, HSS 910 may also specify specific QoS parameters such as the QCI for the default EPS bearers that reflects the QOS adjustment(s). In certain embodiments, the HSS 910 may also specify suitable scaling factors and related QoS parameters (e.g., scaling factor of 1.25 for the Packet Delay Budget applicable to QCI=8 or 9). The scaling factors enable the network to achieve a more stringent QoS or more relaxed QoS compared to standardized QoS characteristics associated with QCIs. For example, in case of an XR application, one set of scaling factors can be applied to one type of XR frames and another set of scaling factors can be applied to another type of XR frames. Note that the same QCI/5QI value can be used for different types of frames but different QoS scaling factors can be applied for different types of XR frames.

The exact intra-network messages in bearer setup signaling 940 depend on the type of the EPS Bearer being established by the MME for UE 116 such as a default EPS bearer and a dedicated EPS bearer. For example, in case of the default EPS Bearer, the MME sends Create Bearer Request message to the S-GW 915 and the S-GW sends Create Bearer Request message to the P-GW. These Create Bearer Request Messages contain the adjusted QoS parameters. The P-GW 915 sends Create Bearer Response message to the S-GW 915 and the S-GW 915 sends Create Bearer Response message to the MME.

In support of bearer setup signaling 940, the MME may choose an S-GW and a P-GW 915 by considering the Network Type. For example, some S-GWs and P-GWs 915 may be optimized for one Network Type or QoS and some S-GWs and P-GWs 915 can be optimized for another Network Type or QoS.

The MME sends INITIAL CONTEXT SETUP REQUEST or E-RAN SETUP REQUEST to ask the eNB to facilitate the setup of an E-UTRAN Radio Access Bearer (E-RAB) 945. These S1AP messages contain the adjusted QoS parameters so that gNB 103 can manage radio resources and set up a suitable Data Radio Bearer (DRB) 950. The DRB 950 reflects the adjusted QoS parameters. For example, in case of an XR application, one set of adjusted QoS parameters is applied to one type of XR frames and another set of adjusted QoS parameters is applied to another type of XR frames. Note that the same QCI/5QI value can be used for different types of frames but different adjusted QoS scaling factors can be applied for different types of XR frames.

In certain embodiments, the MME conveys the adjusted QoS parameters to the UE via NAS signaling 955 such as Activate Default EPS Bearer Context Request or Activate Dedicated EPS Bearer Context Request.

In operation 960, when UE 116 experiences mobility within a network or between two networks, the adjusted QoS parameters are conveyed from the source entity (e.g., source gNB or source MME) to the target entity (e.g., target gNB or target MME) so that the target entity can facilitate implementation of suitable admission control and radio resource management in the target network and can translate or adapt the adjusted QoS parameters to the capabilities of the target network.

In the example shown in FIG. 9, the adjusted QoS parameters can take different forms. In certain embodiments, the existing QCIs are used, and the specific parameters such as the Packet Delay Budget and the Packet Loss Error Rates are scaled by scaling factors. The scaling factors can increase or decrease the numerical values of the QoS parameters; for example, a scaling factor of 1.25 for Packet Delay Budget increases the Packet Delay Budget from 300 ms to (300*1.25=375 ms), and a scaling factor of 0.75 for Packet Delay Budget decreases the Packet Delay Budget from 300 ms to (300*0.75=225) ms. In such embodiment, the QCIs may be preserved as they are or QCIs may transformed such as QCI' or QCIPrime (e.g., QCI=8' or 9' or 5Prime or 9Prime instead of QCI=8 or 9 to imply an adjustment to one or more default values of the QoS parameters associated with the QCI). In certain embodiments, new QCIs are defined for the adjusted QoS with adjustments directly applied to the existing QoS parameter settings. For example, in case of an XR application, one set of scaled Packet Delay Budget and the Packet Loss Error Rates is applied to one type of XR frames and another set of one set of scaled Packet Delay Budget and the Packet Loss Error Rates is applied to another type of XR frames. Note that the same QCI/5QI value can be used for different types of frames but different adjusted QoS scaling factors can be applied for different types of XR frames.

In certain embodiments, selected adjusted QoS characteristics for a given adjusted QCI can be represented by TABLE 1 shown below for an LTE network.

TABLE 1

Selected Adjusted QoS Characteristics for LTE

| QCI Value | Bearer Type | Packet Delay Budget | Packet Loss Rate |
| --- | --- | --- | --- |
| New, Existing, or Adjusted (Prime) | GBR or Non-GBR | L*100 ms | $M*10^{-N}$ |

In TABLE 1, in an example approach, L can be a scaling factor that can be less than 1 or greater than 1, M can be an integer (e.g., from 1 to 9), and N can be an integer (e.g., 1 to 10).

For example, for a GNSS NTN, L can take a value from the set {4, 5, 6, 7, 8, 9, 10, 11, 12, 13, . . . 30}, M can be 1, and N can be a value from the set {2, 3, and 4}.

Figure 10:
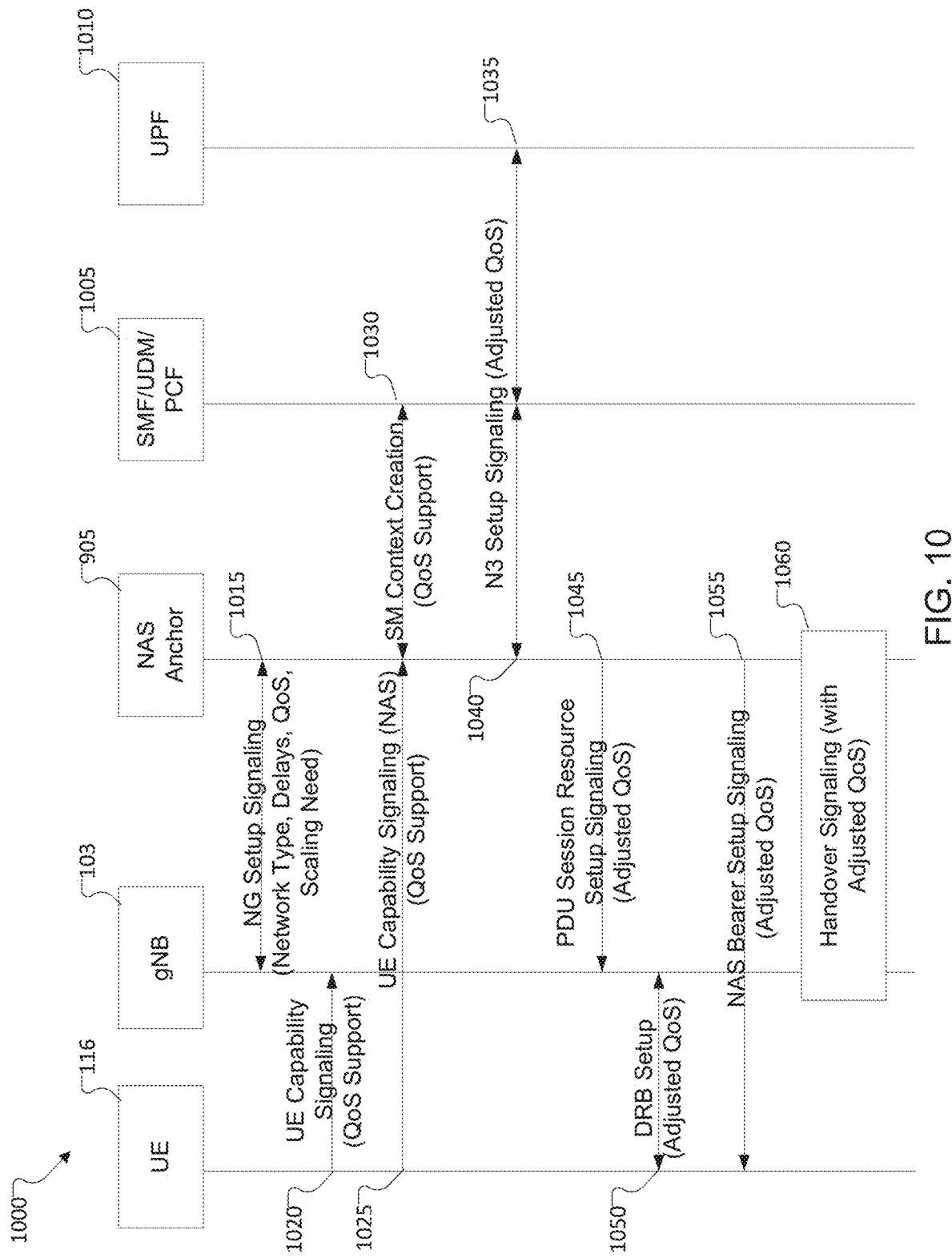
FIG. 10 illustrates an example signaling for Overall UE-Network Procedures for a Flexible QoS Framework in a 5G Network according to embodiments of the present disclosure.

FIG. 10 illustrates an example signaling for Overall UE-Network Procedures for a Flexible QoS Framework in a 5G Network according to embodiments of the present disclosure. An embodiment of the signaling flow for UE-radio network interactions 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. In the example shown in FIG. 10, operations by and signaling between UE 116, gNB 103, NAS Anchor 905, a 5G Session Management Function (SMF)/Unified Data Management (UDM) and Policy Control Function (PCF) 1005, and a User Plane Function (UPF) 1010.

In the example shown in FIG. 10, the Unified Data Management (UDM) and the Policy Control Function (PCF) 1005 keeps a record of the user's QoS subscriptions for the adjusted QoS, where the adjusted QoS is more stringent or less stringent than typical QoS parameters. For example, the UDM and the PCF may include provisioning of longer or shorter delays compared to the target standardized delays based on the user's subscriptions and network capabilities. In certain embodiments, the network capabilities depend on the network type. In one example, the Network Type may distinguish among a regular Terrestrial Network (i.e., the network with typical QoS), a high-performance Terrestrial Network (i.e., the network with typical QoS) and a Non-Terrestrial Network. The user equipment experiences the adjusted QoS based on its own capabilities and the network type that it accesses.

In certain embodiments, gNB 103 and NAS signaling Anchor 905 exchange NG Setup signaling 1015. That is, gNB 103 and NAS signaling anchor 905, that is, the AMF in the 5G Core (5GC) or Next Generation Core (NGC)) exchange NG setup messages of NG SETUP REQUEST and NG SETUP RESPONSE. In certain embodiments, gNB 103 conveys to the AMF the Network Type for each of its cells in NG SETUP REQUEST message. In certain embodiments, gNB 103 explicitly mentions minimum and/or maximum round trip delays between UE 116 and gNB 103 to the AMF. In certain embodiments, gNB 103 mentions the support for QoS scaling for one or more QoS parameters. The QoS scaling (L) can provide a more stringent QoS or a more relaxed QoS in gNB's 103 network compared to standardized QoS. Examples of these QoS parameters include 5QI, packet delay budget (i.e., the delay between the UE and the UPF), and packet loss error rate.

In certain embodiments and in support of NG Setup signaling 1015, gNB 103 may manage some cells that belong to one Network Type (e.g., a TN) and some cells that belong to another Network Type (e.g., an NTN).

In certain embodiments, UE 116 transmits a capability signaling 1020 to gNB 103. In the capability signaling 1020, UE 116 and gNB 103 exchange UE Capability Enquiry and UE Capability Information messages. In certain embodiments, gNB 103 can explicitly request UE 116 to specify its support for adjusted QoS. In certain embodiments, UE 116 specifies its support for the adjusted QoS in response to gNB's 103 request or autonomously. In certain embodiments, the support for the adjusted QoS is implicit and does not require any explicit mention of QoS in the UE Capability Enquiry and UE Capability Information messages.

In certain embodiments, UE 116 transmits a NAS message 1025 for UE capability signaling through gNB 103 to the NAS signaling Anchor 905. In NAS message 1025, UE 116 explicitly conveys its support for the adjusted QoS to the AMF (in NAS signaling Anchor 905) in the NAS message 1025 such as UL NAS Transport (encapsulated in an RRC message such as UL NAS Transport") carrying N1 SM Payload such as PDU Session Establishment Request. In certain embodiments, UE 116 specifies the Network Type and the AMF infers UE's 116 support for the adjusted QoS. In certain embodiments, the AMF infers UE's 116 support for the adjusted QoS using the Network Type. When gNB 103 receives an RRC message from UE 116 containing the NAS message 1025, gNB 103 selects an AMF by considering the Network Type of the cell in which it has received the UE's message. Some AMFs may be optimized for one Network Type and some AMFs may be optimized for another Network Type and NCGI.

The AMF conveys the Network Type to the SMF in Nsmf_PDUSession_CreateSMContextRequest (SM Context Creation) message 1030. In certain embodiments, the AMF indicates to the SMF (within SMF/UDM/PCF 1005) UE's 116 support for the adjusted QoS using the Network Type. The SMF obtains the QoS parameters from the UDM including adjusted QoS parameters, especially default 5QI for the Default QoS Flow. The SMF carries out SM Policy Association Establishment with the PCF. The PCF provides authorized QoS including adjusted QoS parameters. In certain embodiments, the UDM-supplied adjusted QoS parameters may be updated by the PCRF.

In certain embodiments, the UDM/PCF (within SMF/UDM/PCF 1005) also specifies specific QoS parameters, such as the QCI for the QoS Flows that reflect the QoS adjustment(s). In certain embodiments, the UDM/PCF may also specify suitable scaling factors and related QoS parameters (e.g., scaling factor of 1.25 for the Packet Delay Budget applicable to 5QI=8 or 9). The scaling factors enable the network to achieve a more stringent QoS or more relaxed QoS compared to standardized QoS characteristics associated with 5QIs.

In the N3 setup signaling 1035, the SMF configures the UPF 1010 for a QoS Flow (with adjusted QoS parameters) though S4 Session Establishment. In support of N3 setup signaling 1035, the SMF may choose a UPF 1010 by considering the Network Type. For example, some UPFs may be optimized for one Network Type or QoS and some UPFs may be optimized for another Network Type or QoS.

In the N3 setup signaling 1035, the SMF sends Namf_Communication_N1N2MessageTransfer message 1040 to the AMF, which contains adjusted QoS parameters with (i) N2 SM information for the gNB and (ii) N1 SM container for the UE.

The AMF sends PDU Session Resource Setup Request 1045 containing adjusted QoS parameters to ask gNB 103 to facilitate the setup of a QoS Flow. This NGAP message also contains a NAS message for UE 116, such as DL NAS Transport message containing N1 SM information message such as PDU Session Establishment Accept.

Thereafter, gNB 103 establishes a suitable DRB 1050 that reflects the adjusted QoS parameters.

In certain embodiments, UE 116 receives the adjusted QoS parameters from the AMF via NAS signaling 1055 such as DL NAS Transport message containing PDU Session Establishment Accept.

In operation 1060, when UE 116 experiences mobility within a network or between two networks, the adjusted QoS parameters are conveyed from the source entity (e.g., source gNB or source AMF) to the target entity (e.g., target gNB or target AMF) so that the target entity can facilitate implementation of suitable admission control and radio resource management in the target network and can translate or adapt the adjusted QoS parameters to the capabilities of the target network.

In the example shown in FIG. 10, the adjusted QoS parameters can take different forms. In certain embodiments, the existing 5QIs are used and the specific parameters, such as the Packet Delay Budget and the Packet Loss Error Rates, are scaled by scaling factors. The scaling factors can increase or decrease the numerical values of the QoS parameters; for example, a scaling factor of 1.25 for Packet Delay Budget increases the Packet Delay Budget from 300 ms to (300*1.25=375 ms), and a scaling factor of 0.75 for Packet Delay Budget decreases the Packet Delay Budget from 300 ms to (300*0.75=225) ms. In such embodiment, the 5QIs may be preserved as they are or 5QIs may transformed such as 5QI' or 5QIPrime (e.g., 5QI=8' or 9' or 5Prime or 9Prime instead of 5QI=8 or 9 to imply an adjustment to one or more default values of the QoS parameters associated with the 5QI). In certain embodiments, new 5QIs are defined for the adjusted QoS with adjustments directly applied to the existing QoS parameter settings.

In certain embodiments, selected adjusted QoS characteristics for a given adjusted QCI can be represented by TABLE 2 shown below for a 5G network.

TABLE 2

| Selected Adjusted QoS Characteristics for 5G | | | |
| --- | --- | --- | --- |
| 5QI Value | QoS Flow Type | Packet Delay Budget | Packet Loss Error Rate |
| New, Existing, or Adjusted (Prime) | GBR or Non-GBR | L*100 ms | $M*10^{-N}$ |

In TABLE 2, L can be a scaling factor that can be less than 1 or greater than 1, M can be an integer (e.g., from 1 to 9), and N can be an integer (e.g., 1 to 8).

For example, for a GNSS NTN, L can take a value from the set {4, 5, 6, 7, 8, 9, 10, 11, 12, 13, ... 30}, M can be 1, and N can be a value from the set {2, 3, and 4}. As a particular example, L can be set based on whether the network is a GEO, LEO, or high-performance network. That is, when the network is a GEO, L can be set to be 10; when the network is a LEO, L can be set to 2; and when the network is a high-performance network, L can be set to 0.5. Additionally, M and N can be set based on a requirement for regular voice services or relaxed QoS voice services. For example, M can be set to 1 and N set to 1 when regular voice services are desired. Alternatively, M can be set to 2 and N set to 2 when relaxed QoS voice services are desired.

In certain embodiments, in support of the adjusted QoS (i.e., more relaxed or more stringent QoS) for networks such as an NTN, scaling factors for the already-defined standardized QoS parameters such as the Packet Delay Budget (PDB) and the Packet Error Rate (PER) are a function of the network or RAT type (e.g., NR-GEO, NR-MEO, NR-LEO, NR-HAPS, and Air-to-Ground or ATG). In certain embodiments, scaling factors for the already-defined standardized QoS parameters are a function of the 5QI or QCI. In certain embodiments, the scaling factors for the already-defined standardized QoS parameters are a function of both the network/RAT type and 5QI/QCI.

In certain embodiments, the scaling factors are a function of the delay. Such delay reflects the propagation delay only or both propagation and processing delays.

In certain embodiments, for a given 5QI defined for a TN (e.g., 5QIs/QCIs defined in Release 16 and prior releases), adjustments for more relaxed or more stringent QoS are made to the PDB only, the PER only, or both the PDB and the PER.

In certain embodiments, QoS characteristics associated with a given 5QI/QCI (e.g., PDB, PER, and priority) are individually modified by individual scaling factors.

In certain embodiments, the scaling factors that modify the Release 16-defined QoS characteristics are integers (e.g., 1, 2, 3, and so on). In one approach, these scaling factors are floating point numbers (e.g., 1.2, 2.5, 3.5 and so on). In the floating-point presentation, L=P*(Q/R), where P, Q, and R are integers. One set of possible values include {1, 1⅛, 1⅖, ... }, where the increment is ⅛. Another set of possible values include {1, 1½, 2, 2½, . . . }, where the increment is ½. That is, different fractions can be chosen as increments while determining effective scaling factors.

As an example, for the standardized 5QI=8 or 9 in Release 16, the PDB is 300 ms and the PER is $10^{-6}$. For the NTN/RAT Type of NR-GEO, the relaxed QoS can be represented by PDB=SF1*300 ms and the PER can be represented by PER=SF2*$10^{-6}$, where SF1 and SF2 are scaling factors (<1, =1, or >1) that reflect the NTN/RAT Type (or, equivalently the expected delay for such network) and/or the 5QI value (i.e., 5QI=8 or 9).

In another example, for the standardized 5QI=1 in Release 16, the PDB is 100 ms and the PER is $10^{-2}$. For the NTN/RAT Type of NR-GEO, the relaxed QoS can be represented by PDB=SF3*100 ms and the PER can be represented by PER=SF4*$10^{-2}$, where SF3 and SF4 are scaling factors (<1, =1, or >1) that reflect the NTN/RAT Type (or, equivalently the expected delay for such network) and/or the 5QI value (i.e., 5QI=19).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
    a processor configured to:
        generate an indicator indicating that the UE is capable of supporting adjusted quality of service (QoS), wherein the adjusted QoS corresponds to a scaling of QoS parameters associated with an existing QoS indicator; and
        generate a capability message comprising the indicator; and
    a transceiver operably connected to the processor, the transceiver configured to:
        transmit, to a base station (BS), the capability message including the indicator; and
        receive, from the BS, a message comprising an adjusted QoS value based on the scaling of the QoS parameters associated with the existing QoS indicator.

2. The UE of claim 1, wherein the adjusted QoS comprises QoS scaling factors for the QoS parameters associated with the existing QoS indicator.

3. The UE of claim 2, wherein the QoS scaling factor is configured to indicate one of:
    more relaxed QoS parameters compared to a set of fixed QoS parameters associated with the existing QoS indicator; or
    more stringent QoS parameters compared to a set of fixed QoS parameters associated with the existing QoS indicator.

4. The UE of claim 2, wherein the QoS scaling factor is configured to define an adjusted value for the QoS parameter of a packet delay budget or define an adjusted value for the QoS parameter of a packet loss error rate.

5. The UE of claim 2, wherein the QoS scaling factor comprises:
    a first value corresponding to a geosynchronous equatorial orbit (GEO) network;
    a second value corresponding to a low earth orbit (LEO) network; or
    a third value corresponding to a high-performance network.

6. The UE of claim 2, wherein the QoS scaling factors correspond to one of:
    a regular voice service; or
    a relaxed QoS voice service.

7. The UE of claim 2, wherein the QoS scaling factors correspond to one of:
    a first value for a first type of frames; or
    a second value for a second type of frames.

8. A base station (BS) in a wireless communication system, the BS comprising:
    a transceiver configured to receive, from a user equipment (UE), a capability message comprising an indicator, the indicator configured to indicate that the UE is capable of supporting adjusted quality of service (QoS), wherein the adjusted QoS corresponds to scaling of QoS parameters associated with an existing QoS indicator; and
    a processor operably connected to the transceiver, the processor configured to:
        identify the indicator;
        transmit a variable QoS capability to a network entity;
        receive an adjusted QoS value from the network entity, the adjusted QoS value based on the scaling of QoS parameters associated with the existing QoS indicator; and
        transmit the adjusted QoS value to the UE.

9. The BS of claim 8, wherein the adjusted QoS comprises QoS scaling factors for the QoS parameters associated with the existing QoS indicator.

10. The BS of claim 9, wherein the QoS scaling factor is configured to indicate one of:
    more relaxed QoS parameters compared to a set of fixed QoS parameters associated with the existing QoS indicator; or
    more stringent QoS parameters compared to a set of fixed QoS parameters associated with the existing QoS indicator.

11. The BS of claim 9, wherein the QoS scaling factor is configured to define an adjusted value for the QoS parameter of a packet delay budget, or
    define an adjusted value for the QoS parameter of a packet loss error rate.

12. The BS of claim 9, wherein the QoS scaling factor comprises:
    a first value corresponding to a geosynchronous equatorial orbit (GEO) network;
    a second value corresponding to a low earth orbit (LEO) network; or
    a third value corresponding to a high-performance network.

13. The BS of claim 9, wherein the QoS scaling factors correspond to one of:
    a regular voice service; or
    a relaxed QoS voice service.

14. The BS of claim 9, wherein the QoS scaling factors correspond to one of:
- a first value for a first type of frames; or
- a second value for a second type of frames.

15. A method of a user equipment (UE) in a wireless communication system, the method comprising:
- generating an indicator indicating that the UE is capable of supporting adjusted quality of service (QoS), wherein the adjusted QoS corresponds to scaling of QoS parameters associated with an existing QoS indicator;
- generating a capability message comprising the indicator;
- transmitting, to a base station (BS), the capability message including the indicator; and
- receiving, from the BS, a message comprising an adjusted QoS value based on the scaling of QoS parameters associated with the existing QoS indicator.

16. The method of claim 15, wherein the adjusted QoS comprises QoS scaling factors for the QoS parameters associated with the existing QoS indicator, and further comprising:
- indicating, by the indicator one of: more relaxed QoS parameters compared to a set of fixed QoS parameters associated with the existing QoS indicator; or more stringent QoS parameters compared to a set of fixed QoS parameters associated with the existing QoS indicator.

17. The method of claim 16, wherein the QoS scaling factor is configured to define an adjusted value for the QoS parameter of a packet delay budget, or
- define an adjusted value for the QoS parameter of a packet loss error rate.

18. The method of claim 16, wherein the QoS scaling factor comprises:
- a first value corresponding to a geosynchronous equatorial orbit (GEO) network;
- a second value corresponding to a low earth orbit (LEO) network; or
- a third value corresponding to a high-performance network.

19. The method of claim 17, wherein the QoS scaling factors correspond to one of:
- a regular voice service; or
- a relaxed QoS voice service.

20. The method of claim 17, wherein the QoS scaling factors correspond to one of:
- a first value for a first type of frames; or
- a second value for a second type of frames.

* * * * *